(12) United States Patent
Gysel et al.

(10) Patent No.: US 12,505,207 B2
(45) Date of Patent: Dec. 23, 2025

(54) AI ASSISTED GENERATION OF RULES FOR MALWARE DETECTION WITH TRANSFORMER ATTENTION MECHANISM

(71) Applicant: Acronis International GmbH, Schaffhausen (CH)

(72) Inventors: Philipp Gysel, Bern (CH); Candid Wuest, Bassersdorf (CH); Dinil Mon Divakaran, Singapore (SG); Kenneth Nwafor, Singapore (SG); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 98 days.

(21) Appl. No.: 18/399,250

(22) Filed: Dec. 28, 2023

(65) Prior Publication Data
US 2025/0217477 A1    Jul. 3, 2025

(51) Int. Cl.
*G06F 21/55* (2013.01)
*G06F 21/56* (2013.01)

(52) U.S. Cl.
CPC .......... *G06F 21/552* (2013.01); *G06F 21/561* (2013.01); *G06F 2221/033* (2013.01)

(58) Field of Classification Search
CPC .................................................... G06F 21/552
See application file for complete search history.

(56) References Cited

U.S. PATENT DOCUMENTS

| | | | |
|---|---|---|---|
| 8,266,698 B1 | 9/2012 | Seshardi et al. | |
| 9,928,366 B2 | 3/2018 | Ladnai et al. | |
| 10,037,689 B2 * | 7/2018 | Taylor | G05D 1/0285 |
| 10,176,321 B2 | 1/2019 | Abbasi et al. | |
| 10,462,173 B1 * | 10/2019 | Aziz | H04L 63/1433 |
| 11,444,957 B2 | 9/2022 | Zhang | |
| 11,477,232 B2 | 10/2022 | Kulaga et al. | |
| 11,481,492 B2 * | 10/2022 | Tsao | H04L 63/1425 |
| 11,513,878 B2 | 11/2022 | Kulaga et al. | |
| 11,586,736 B2 | 2/2023 | Strogov et al. | |
| 11,609,988 B2 | 3/2023 | Strogov et al. | |
| 11,611,586 B2 | 3/2023 | Strogov et al. | |
| 2017/0214701 A1 * | 7/2017 | Hasan | H04L 63/1433 |
| 2022/0188417 A1 | 6/2022 | Prudkovskij et al. | |
| 2024/0281531 A1 * | 8/2024 | Taylor | G06F 21/564 |

OTHER PUBLICATIONS

Alexander Ivanyuk. Acronis Machine Learning Improves Ransomware Detection, Nov. 23, 2017, https://www.acronis.com/en-us/blog/posts/acronis-machine-learnirg-improves-ransomware-detection/, Acronis Machine Learning Improves Ransomware Detection.pdf.

\* cited by examiner

*Primary Examiner* — Simon P Kanaan
(74) *Attorney, Agent, or Firm* — ESPE Legal Consultancy FZ-LLC

(57) ABSTRACT

Systems and methods implement artificial intelligence to automatically generate malware detection rules. In a first phase, an AI model is trained on large amounts of data, so the AI model can learn to distinguish between benign applications and different malware families. In a second phase, the AI model is queried with new malware samples, and systems and methods propose new malware detection rules for those samples.

20 Claims, 7 Drawing Sheets

AI ASSISTED GENERATION OF RULES FOR MALWARE DETECTION WITH TRANSFORMER ATTENTION MECHANISM

TECHNICAL FIELD

The invention relates generally to malware detection. More particularly, the invention relates to the generation of rules for malware detection.

BACKGROUND

Malware detection systems like antivirus and endpoints detection and response (EDR) solutions keep companies safe from malware attacks. Creating such malware detection systems is becoming increasingly time-consuming and expensive, as attackers constantly find new vulnerabilities and obfuscation techniques. In the past, malware detection rules were created manually by human analysts. However, due to the huge amount of new malware samples appearing every day, such an approach is no longer cost-effective or scalable. Therefore, the cyber security industry has increasingly shifted to the use of artificial intelligence (AI).

While AI has the capability to analyze huge amounts of data and learn complex relationships that might not be detectable by a human, this technology has its own shortcomings. AI can make mistakes, which becomes costly when dealing with malware, such as in the case of false positives or false negatives. Moreover, AI lacks transparency, making it hard for professionals to understand the reason for a verdict of AI. Therefore, there is a need for improved malware detection.

SUMMARY

Embodiments described or otherwise contemplated herein substantially meet the aforementioned needs of the industry. Embodiments described herein include systems and methods of a security solution wherein malware signatures are created in a semi-automated fashion. Using AI, embodiments can easily deal with the huge amount of new malware samples appearing every day, and the burden for human analysts is drastically reduced. At the same time, embodiments keep a human analyst in the loop, which allows for the adjustment of proposed malware signatures thereby keeping malware detection precise.

Embodiments provide transparency by the use of backpropagation algorithms such that there is no "black-box" AI. In contrast to existing solutions that use AI for malware detection or detection rule creation as a "black box", embodiments described herein offer transparency as to how the AI model reached a certain verdict. During rule generation, embodiments utilize a backpropagation algorithm to show exactly why a computer application is expected to be malicious. More particularly, embodiments find the crucial parts of a behavior sequence which lead the AI model to reach its verdict and use those crucial parts of the behavior sequence (e.g. a pattern) to automatically propose a malware detection rule.

Embodiments utilize an AI transformer model for behavior sequence classification. In contrast to existing solutions that use sequence models like LSTM (long short-term memory network) or RNN (recurrent neural network), embodiments described herein utilize a novel AI transformer neural network model.

Embodiments provide a lightweight detection engine. The behavior rules generated by embodiments described herein can be applied by a simple behavior monitoring system. More particularly, embodiments do not require any AI model at runtime (but rather uses an AI model during training). Accordingly, because embodiments of the detection engine do not require any AI model, it can run fast and with low resource consumption. Moreover, embodiments described herein use clustering for malware families. In certain embodiments, a single detection rule per malware family version can be implemented, which helps to further decrease resource requirements for the protection system.

Embodiments keep a human in the loop. Some existing malware detection systems purely rely on artificial intelligence such that no human analyst is involved. This approach lacks transparency and is prone to wrong predictions, as the AI system is not verified by a human, and the AI system relies on complex algorithms which are hard to understand (e.g., deep neural networks). In contrast, embodiments described herein create simple malware rules and offer the possibility for human analysts to review the rules and make adjustments where needed.

Embodiments save time. In traditional malware detection systems, the process of creating new malware rules is time consuming and complex. Traditionally, a security analyst is tasked with manually analyzing the behavior of new malware samples, as they appear in the wild. In contrast, embodiments described herein simplify the process of creating new malware rules drastically by strategically implementing artificial intelligence to automatically generate new behavior rules.

Embodiments implement dynamic analysis. In traditional malware detection systems, static analysis (such as at the binary code level) can detect when a new application has a close similarity to known malware by focusing on static features of malware binary files. In contrast, embodiments described herein implement a dynamic analysis by focusing on application behavior. In an embodiment, a dynamic analysis means that the malware sample is executed and run, so that it can interact with a system (real, virtual or sandbox). This means that the malware sample will show its behavior like for example encrypting files, changing configuration files, starting new processes, or connecting to the Internet etc., which is in contrast to static analysis, which does not execute the sample, and simply "reads" the source code and makes predictions based on code similarity. A static analysis requires deobfuscating and decrypting all code in order to understand the code. Behavior in the dynamic analysis disclosed herein can not easily be hidden. Rather, the exhibited behavior generates sequences of behavior. Embodiments of dynamic analysis include real-time monitoring of anything happening on the real production system.

In an embodiment, a computer-implemented method of protecting a system endpoint comprises logging behavior information of an application executing on an endpoint; generating a sequence of vectors for the behavior information including: creating a process behavior graph depicting all processes of the application, relationships between processes, and behavior of individual processes, and transforming the process behavior graph into a linear sequence of elements, wherein each element represents a node from the process behavior graph; pretraining an AI model on the linear sequence of elements, wherein the AI model is a foundational transformer neural network; tuning the AI model according to a malware family prediction or a benign application; querying the AI model with a new malware sample; proposing a malware detection rule based on the new malware sample, the malware detection rule including the malware family prediction; and backpropagating the malware family prediction through the AI model to adjust the AI model, including by identifying at least one feature of the queried new malware sample that most contributed to the malware family prediction.

In an embodiment, a system for protecting a system endpoint comprises an endpoint database configured to store behavior information of an application executing on an endpoint; a proposal subsystem including: a representation engine configured to: generate a sequence of vectors for the behavior information including: creating a process behavior graph depicting all processes of the application, relationships between processes, and behavior of individual processes, and transforming the process behavior graph into a linear sequence of elements, wherein each element represents a node from the process behavior graph; a training engine configured to: pretrain an AI model on the linear sequence of elements, wherein the AI model is a foundational transformer neural network, and tune the AI model according to a malware family prediction or a benign application, the AI model configured to be queried with a new malware sample; and a rules generation engine configured to: propose a malware detection rule based on the new malware sample, the malware detection rule including the malware family prediction, and backpropagate the malware family prediction through the AI model to adjust AI model, including by identifying at least one feature of the queried new malware sample that most contributed to the malware family prediction.

In an embodiment, a computer-implemented method of protecting a system endpoint, the method comprising: creating a plurality of sequences of behavior events for logged endpoint detection and response (EDR) data including by generating a process graph depicting all processes of an application, relationships between processes, and behavior of individual processes and transforming the process graph into a linear sequence of elements; pretraining a foundational neural network machine learning (ML) model using the linear sequence of elements; tuning the AI model according to a malware family or a benign application; querying the ML model with a new malware sample to determine a malware prediction; backpropagating the malware prediction through the ML model, including by identifying a feature of the queried new malware sample that most contributed to the malware prediction; and adjusting the ML model according to the backpropagating based on the feature of the queried new malware sample that most contributed to the malware prediction.

BRIEF DESCRIPTION OF THE DRAWINGS

Subject matter hereof may be more completely understood in consideration of the following detailed description of various embodiments in connection with the accompanying figures, in which.

Figure 1:
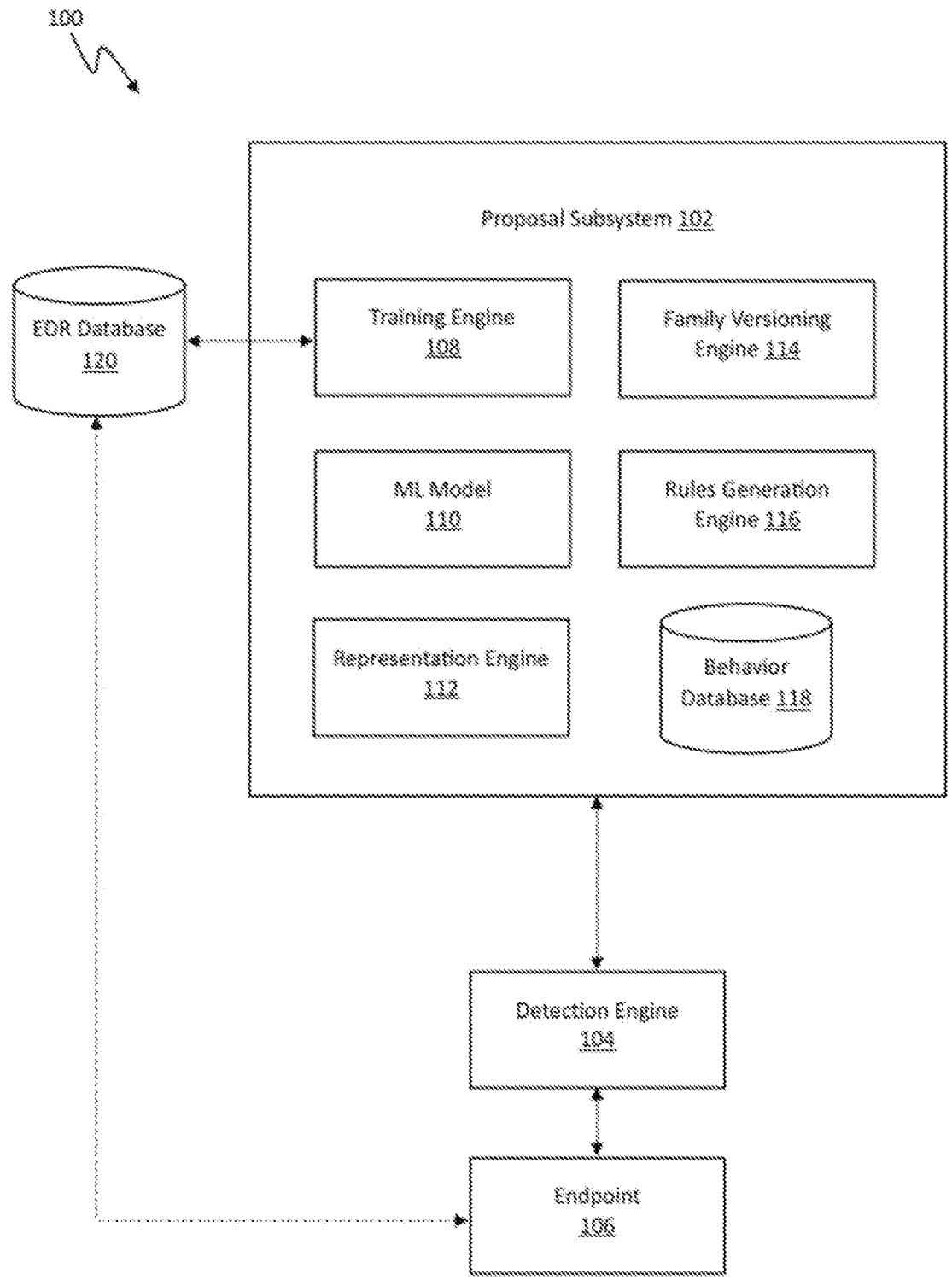
FIG. 1 is a block diagram of a malware detection system, according to an embodiment.

The embodiments described are exemplary ways to use the invention to solve technical problems in the field of the invention. The solutions and techniques disclosed may also be used to solve other problems in the field or to solve similar problems in other fields. Substitutions, modifications, and equivalents known to those of skill in the art may be used to implement these solutions and techniques, consistent with scope of the invention described in the claims.

DETAILED DESCRIPTION

Systems and methods implement artificial intelligence to automatically generate malware detection rules. Embodiments can be implemented in a phased approach. In a first phase, an AI model is trained on large amounts of data, so the AI model can learn to distinguish between benign applications and different malware families. In a second phase, the AI model is queried with new malware samples, and systems and methods propose new malware detection rules for those samples.

Embodiments described herein includes various engines, each of which is constructed, programmed, configured, or otherwise adapted, to autonomously carry out a function or set of functions. The term engine refers generally to a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Referring to FIG. 1, a block diagram of a malware detection system 100 is depicted, according to an embodiment. In an embodiment, malware detection system 100 generally comprises proposal subsystem 102 and detection engine 104 for protecting a system endpoint 106.

Endpoint 106 can be a physical device that connects to and exchanges information with a computer network. For example, endpoint 106 can be a mobile device, desktop computer, virtual machine, embedded device, or server. In further examples, endpoint 106 can be an Internet-of-Things (IoT) device such as a camera, lighting, refrigerator, security system, smart speaker, and thermostat.

Proposal subsystem 102 generally comprises a training engine 108, a machine learning (ML) model 110, a representation engine 112, a family versioning engine 114, a rules generation engine 116, and a behavior database 118. As illustrated and described herein, proposal subsystem 102 is configured for training (or pretraining) ML model 110, fine-tuning the trained ML model 110, applying the fine-tuned and trained ML model 110 on one or more samples, and generating of a rule in response to ML model 110 output. The rule can be applied by detection engine 104 to protect endpoint 106 from malware.

As depicted in FIG. 1, system 100 can further comprise an endpoint detection and response (EDR) database 120. EDR database 120 is configured to store data related to endpoint 106 detection and response systems (such as detection engine 104). In an embodiment, EDR database 120 receives data for all existing security solutions running at the customer endpoints (e.g. endpoint 106). In an embodiment, EDR database 120 receives data for a particular security solution from endpoint 106, or the security solution itself (e.g. detection engine 104). EDR database 120 stores the behavior of all running applications. EDR database 120 is therefore configured to gather behavior data from a large number of applications, including endpoint applications and EDR applications. Behavior data is thereby logged.

Training engine 108 is configured to train ML model 110 on vast amounts of data such that ML model 110 can learn the behavior patterns of benign and malicious applications. In order to have enough data, training engine 108 is operably coupled to EDR database 120 such that training engine 108 has access to data related to endpoint 106 detection and response systems. In an embodiment, training engine 108 is further configured for fine-tuning operations, as will be described further with respect to FIG. 3.

In an embodiment, an analyst user can review the scoring and adjust it if needed by providing feedback to engine 110. Furthermore, the analyst user can set a threshold of the scores for back propagation, so that either the 2,3,4 or n most important features are reported back.

In an embodiment, ML model 110 can analyze a malware sample in the form of one or more sequences of vectors associated with the malware sample behavior and output a malware prediction (e.g. malware family prediction). In an embodiment, ML model 110 can further output an extraction of the most relevant parts in the behavior pattern of the malware sample.

Machine learning refers generally to training computers to make decisions from data without being explicitly programmed. It involves training algorithms on data sets to recognize patterns, make predictions, or perform tasks, becoming more accurate as they process more data. A variety of machine learning techniques may be employed in alternative embodiments. Examples include Supervised Learning, where models learn from labeled data. This includes linear regression for predicting continuous outcomes, logistic regression for classification tasks, and more complex neural networks. Unsupervised Learning, which works with unlabeled data to uncover hidden patterns, may also be used. Techniques like k-means clustering may be used to group similar data points, while Principal Component Analysis is instrumental in reducing the dimensionality of large datasets, aiding in data visualization and efficiency. Semi-Supervised Learning is another option. This technique merges the concepts of supervised and unsupervised learning. Another possible technique is Reinforcement Learning, characterized by using agents that learn optimal behaviors through trial and error in a specific environment. Other possible techniques include Deep Learning (multi-layered neural networks to process large volumes of data), Convolutional Neural Networks (CNNs), and Recurrent Neural Networks (RNNs). Transfer Learning is yet another alternative that involves taking a pre-trained model, like the text-processing GPT, and fine-tuning it for specific tasks. Ensemble Methods, which include Bagging, Boosting, and Stacking, enhance model performance by combining predictions from multiple models. In some embodiments, algorithms like Random Forest (a type of Bagging) and Gradient Boosting Machines can be used for predictive modeling. Other machine learning techniques may also be used, either alone or in combination with the techniques described above, as long as they are consistent with the object and purpose of the invention. The disclosed embodiments are given as examples of possible implementations and embodiments. The invention is not limited to these examples.

Representation engine 112 is configured to generate one or more sequences of events such that the behavior of an application or process can be represented as a sequence of vectors. For example, in the training context, representation engine 112 is configured to generate sequences of events from the data in EDR database 120. In another example, in the rule generation or ML model 110 application context, representation engine 112 is configured to generate sequences of events for new malware samples in order to query the AI model (e.g. ML model 110) with new malware samples. Representation engine 112 is further depicted and described in FIGS. 4 and 5.

Family versioning engine 114 is configured to determine a malware family version for a malware sample (in the ML model application context). In an embodiment, family versioning engine 114 is configured to analyze the behavior of a malware sample based on the output of ML model 110. Family versioning engine 114 operation is further depicted and described in FIGS. 4 and 6.

Rules generation engine 116 is configured to determine a common pattern in a malware family and to generate a new rule (in the ML model application context) based on the common pattern. In an embodiment, the rule can be automatically applied (e.g. included in a malware detection rules database-not depicted in FIG. 1) for execution by detection engine 104. In another embodiment, the rule can be presented to an analyst user for approval of the rule. Rules generation engine 116 is further depicted and described in FIGS. 4 and 7. In addition, rules generation engine 116 is configured for backpropagation in order to propagate the prediction score of ML model 110 back to the parameters of ML model 110. Accordingly, it can be determined which of the input portions had the largest influence on the model's output prediction, and ML model 110 can be adjusted.

Behavior database 118 is configured to store data related to malware behavior. For example, ML model 110 can analyze behavior of a malware sample (using sequences of events from representation engine 112) to generate a behavior pattern. The behavior pattern can be stored in behavior database 118 as data associated with the particular malware sample. Though behavior database 118 is depicted as integrated in proposal subsystem 102, behavior database 118 can likewise be an external database accessible by components of proposal subsystem 102.

Detection engine 104 is a lightweight malware detection monitoring component configured to detect malware on endpoint 106. In an embodiment, detection engine 104 has a small memory footprint (RAM usage) and low CPU usage, and overall a low usage of system resources. In an embodiment, detection engine 104 does not include any AI model at runtime, thereby implementing a lightweight engine. In an embodiment, detection engine 104 operates with just one detection rule per malware family version, thereby implementing a lightweight engine. Accordingly, detection engine 104 can run fast and with low resource consumption.

Detection engine 104 is operably coupled to endpoint 106. Though detection engine 104 and endpoint 106 are depicted in FIG. 1 as separate components, detection engine 104 and its components or some of its components can be physically located on endpoint 106. In other embodiments, detection engine 104 is communicatively coupled to endpoint 106 such as over a communications network. In particular, detection engine 104 is configured to apply one or more malware detection rules generated by proposal subsystem 102.

Figure 2:
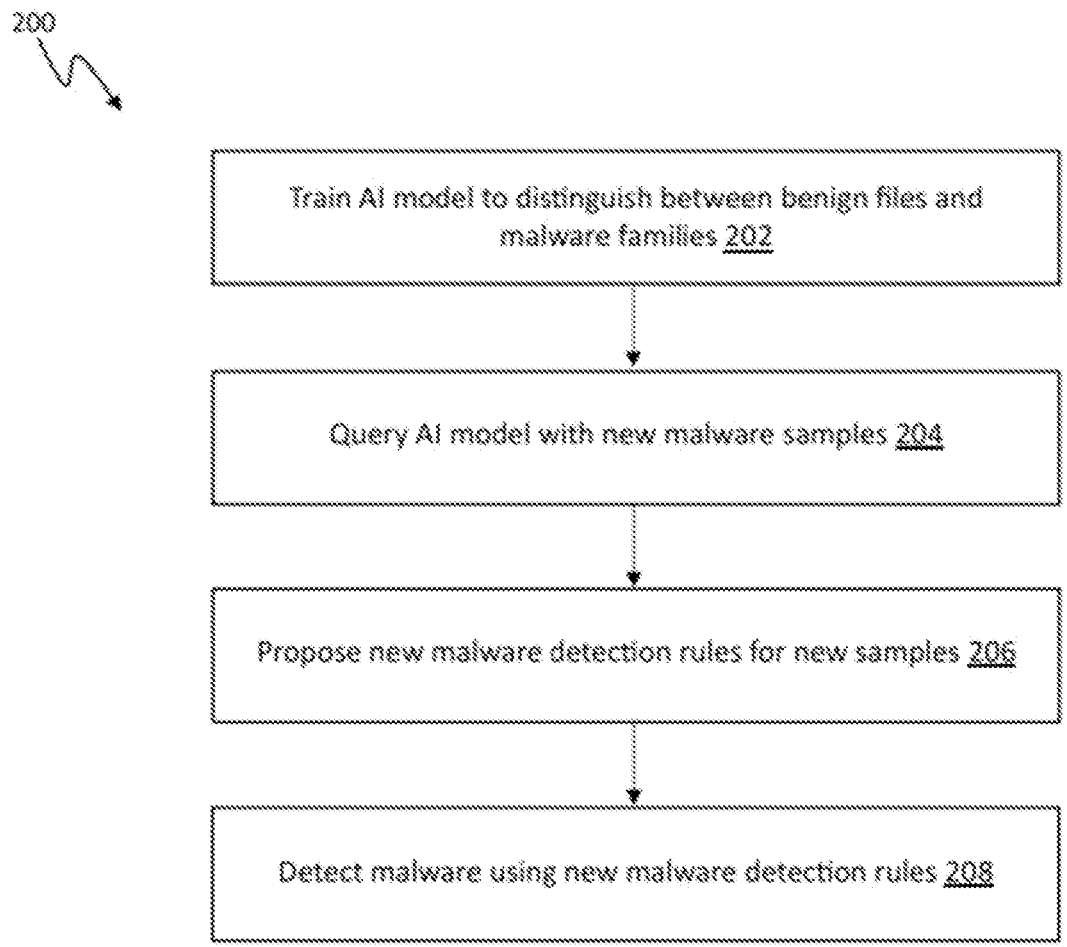
FIG. 2 is a flowchart of a method for malware detection, according to an embodiment.

Referring to FIG. 2, a flowchart of a method 200 for malware detection is depicted, according to an embodiment. In embodiments, method 200 can be implemented by system 100.

At 202, an AI model is trained to distinguish between benign files and malware families. For example, training engine 108 can train ML model 110 using data from EDR database 120, and other proposal subsystem 102 components, including representation engine 112.

At 204, the AI model is queried with one or more new malware samples 204. For example, ML model 110 can be queried with a malware sample from endpoint 106. Representation engine 112 can be utilized to represent the behavior of the malware sample as sequences of vectors (which is analyzed by ML model 110 as queried), and, based on a common malware family version determined by family versioning engine 114, rules generation engine 116 can be utilized to analyze and determine a common pattern in the behavior of the malware family.

At 206, new malware detection rules are proposed for the one or more new malware samples. For example, rules generation engine 116 can propose a new rule based on the common pattern in the behavior of the malware family.

At 208, malware is detected using the new malware detection rules. For example, detection engine 104 can detect malware on endpoint 106 using the rule generated from proposal subsystem 102.

Figure 3:
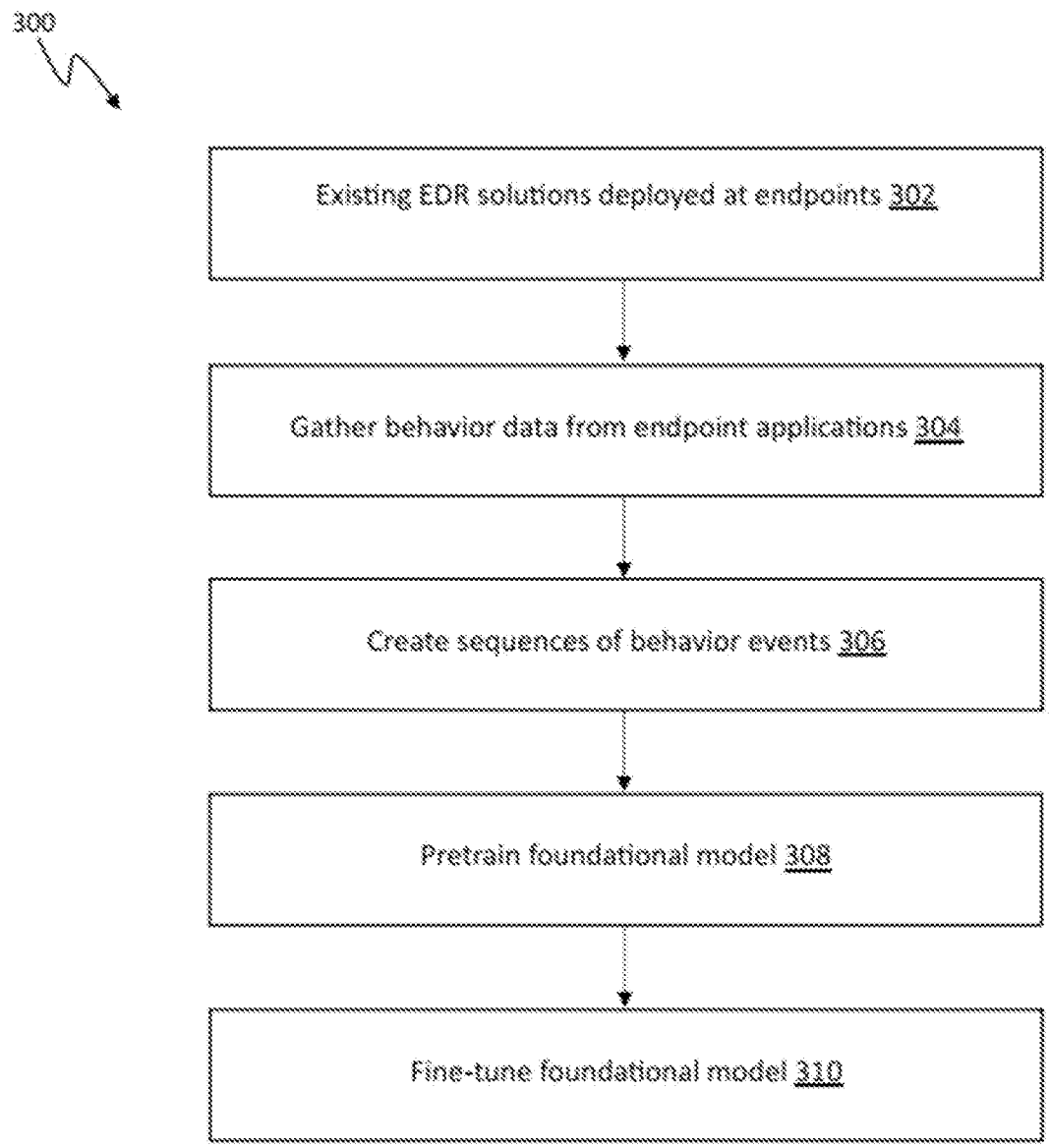
FIG. 3 is a flowchart of a method for training an AI model for malware classification, according to an embodiment.

Referring to FIG. 3, a flowchart of a method 300 for training an AI model for malware classification is depicted, according to an embodiment. Method 300 can, for example, be utilized to train and fine-tune ML model 110.

At 302, existing EDR solutions are deployed at endpoints. For example, traditional EDR solutions can be deployed at endpoints. In another example, embodiments described herein of EDR solutions can be deployed (e.g. detection engine 104 for endpoint 106).

At 304, behavior data is gathered from endpoint applications. In particular, to get enough data to train ML model 110, data is gathered from an existing security solution running at the customer endpoints. Security solutions log the behavior of all running applications, for example in EDR database 120.

At 306, sequences of behavior events associated with the behavior of the running applications are created. For example, application behavior can be represented as a sequence of vectors, such as those created by representation engine 112.

At 308, the foundational model is pretrained. For example, ML model 110 is trained to learn the structure of behavior sequences. In an embodiment, ML model 110 is a foundational transformer neural network. Since the model is a foundational model trained from scratch, huge amounts of data are utilized. In embodiments, 100,000 sample executions are utilized. In other embodiments, fewer than 100,000 sample executions are utilized. In other embodiments, greater than 100,000 sample executions are utilized, including at least one million data sequences.

An advantage of using a foundational model is because it is trained on generic pretraining tasks on a large array of computer applications, which are broader in scope than the single task of malware classification, thereby integrating a broader set of data for future classification.

In an embodiment, a pretraining task of the foundational model can include masked event prediction (predict the next behavior event). In an embodiment, a pretraining task of the foundational model can include masked feature prediction (only hide one feature of an event, and try to predict this feature). In an embodiment, a pretraining task of the foundational model can include next sequence prediction (predict if two sequences come from the same application). In an embodiment, a pretraining task of the foundational model can include binary classification (e.g. "Is this a benign or malicious application?"). In an embodiment, a pretraining task of the foundational model can include classification into application type. Application types can include hardware drivers, Windows system background processes, chat applications, E-mail applications, and web browsers, etc.

At 310, the foundational model is fine-tuned for malware classification. Once the foundational model is fully trained, it can be fine-tuned on downstream tasks. Downstream tasks include malware family prediction. In an embodiment, "benign" applications are one more type of application. In other words, the model can be further trained or "tuned" for classification prediction specific to malware classification. Further, because the downstream training is very quick, it can be repeated later in time, once new malware samples appear.

Figure 4:
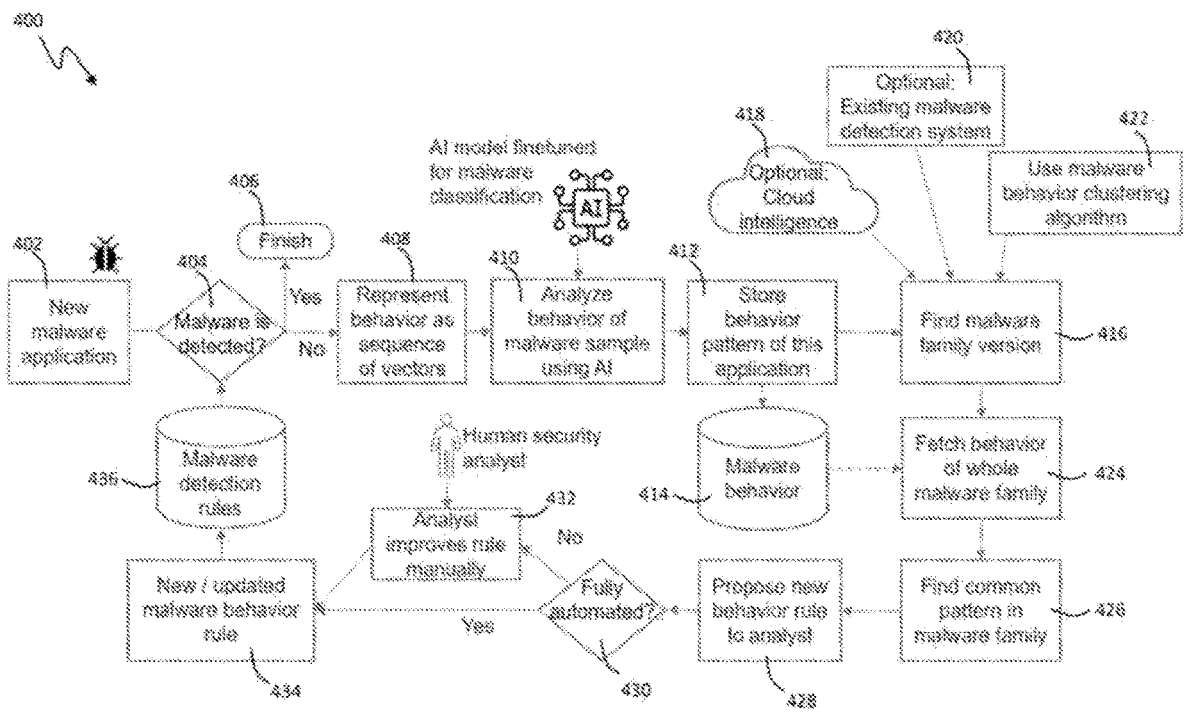
FIG. 4 is a flowchart of a method for proposing new malware detection rules, according to an embodiment.

Referring to FIG. 4, a flowchart of a method 400 for proposing new malware detection rules is depicted, according to an embodiment. In particular, once a foundational model is trained and fine-tuned, it can be applied to generate new malware detection rules, in coordination with other operations as described herein.

At 402, when the system detects a new malware sample at an endpoint, embodiments monitor the behavior pattern of the new malware sample and feed the behavior sequence to the existing malware detection system at 404. If the system already contains a matching behavior rule, no more work needs to be done, and method 400 exits at 406.

However, if the system does not contain a matching behavior rule, method 400 utilizes the AI model to generate a new rule. At 408, the behavior of the new malware sample is represented as a sequence of vectors.

Figure 5:
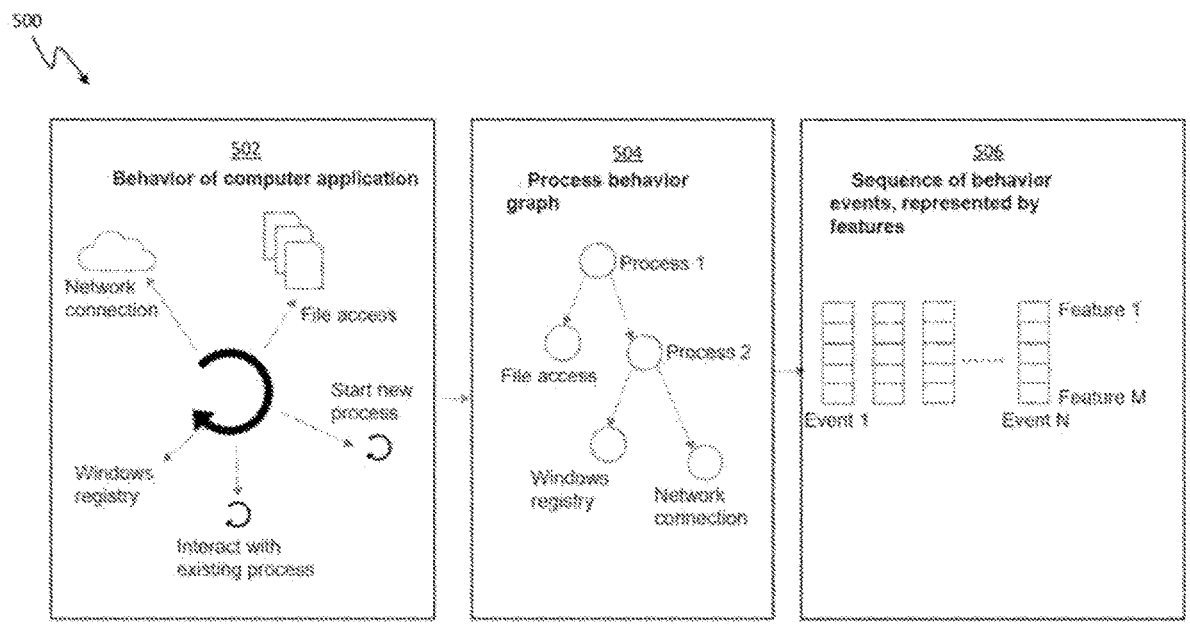
FIG. 5 is a flowchart of a method of representing behavior, according to an embodiment.

Referring further to FIG. 5, a flowchart of a method 500 of representing behavior is depicted, according to an embodiment. In an embodiment, representation engine 112 is configured to implement method 500 to represent application behavior as a sequence of vectors.

Different computer applications have different behavior. Here, behavior refers to the sequence of operating system kernel calls made. At 502, various example calls are illustrated, which can include file operations (read/write/delete/update); Windows registry operations (read/write/update); network connections (TCP or UDP connections); start of new processes; interaction with an existing process (process injection, Remote Procedure Call (RPC) call, write into the Asynchronous Procedure Calls (APC) queue, etc.); other Windows system calls.

To capture the behavior of an application, the application has to be executed on an endpoint. The endpoint can either be a real customer computer, or a dedicated sandbox, or a virtual machine. During execution of the application, the behavior is logged by an agent running on the user endpoint. If the endpoint is a VM or a sandbox, an alternative option is to emulate all instructions of the application, rather than actually running the application. At 504, because most malware creates multiple processes, embodiments create a process behavior graph, which shows all started processes and the relationship between such processes, as well as the behavior of each individual process. For example, in a relationship at 504, Process 1 executes Process 2. Each node in the graph represents one specific behavior action, such as, for example, a file write event.

At 506, the process behavior graph described above gets transformed into a linear sequence. In the sequence, each element represents one node from the behavior graph. The elements in the sequence are ordered by timestamp. For each element, a set of security relevant features are extracted, such as the examples discussed below.

In example features, file operations information is extracted; for example, information can include file location, size of the file, file operation: read/write/update/delete, number of files being touched per second, sensitivity of files accessed (e.g. web cookies or crypto currency wallets).

In example features, Windows registry operations are extracted; for example, information about a key that can be used for persistence, information about a key that configures the network, or information about whether the key contains information about the host system.

In example features, network connections information is extracted; for example, transport layer and application layer protocol, direction (inbound vs. outbound), size of payload, or age and reputation of public domain, if present.

In example features, new process start information is extracted; for example, whether the process is a living-off-the-land binary, whether the process started with an executable on disk, or in-memory, name of the binary, command line arguments, whether privilege escalation is present, for PowerShell, a reputation of script based on an external PowerShell analyzer tool, or for PowerShell, whether many obfuscation characters are present in the script.

In example features, interaction with an existing process information is extracted; for example, for process injection, the type of process injection (DLL injection, process hollowing, APC injection, portable executable (PE) injection, etc.), or for RPC calls, the type of RPC call.

In example features, other Windows system calls information is extracted; for example, a suspicious looking sleep operation, whether a Windows service getting registered, or whether a Windows system call is used to detect sandboxing.

Referring again to FIG. 4, at 410, behavior of the malware sample is analyzed using an AI model fine-tuned for malware classification. For example, ML model 110 can be used to analyze the malware sample represented as a sequence of vectors. In an embodiment, the malicious behavior pattern (as a sequence of vectors) is sent to ML model 110, which extracts the most relevant parts in the behavior pattern and outputs a malware prediction.

At 412, the malicious behavior pattern for the malware sample is stored in a database. In an embodiment, representation engine 112 can store the malicious behavior pattern in behavior database 118. In another embodiment, ML model 110 (or family versioning engine 114 being communicatively coupled to ML model 110) can store the extracted relevant features of the particular behavior pattern output by ML model 110 in the malware behavior database (e.g. 118) at 414.

At 416, embodiments determine a malware family version to which the malware belongs. In an embodiment, family versioning engine 114 can determine a malware family version associated with the malware. For example, in an optional embodiment, at 418, a cloud intelligence service can be utilized. In an optional embodiment, at 420, existing detection rules can be utilized. In an embodiment, at 422, a malware clustering algorithm can be utilized. Accordingly, method 400 can leverage three different sources of information as needed. In the best case, cloud intelligence at 418 or existing detection rules at 420 will be able to classify a malware sample into an exact malware family. For malware that hasn't been seen before, a third source of information needs to be consulted, namely a malware database. Embodiments utilize an advanced clustering algorithm to infer the malware family version at 422 to determine the malware family version at 416.

Figure 6:
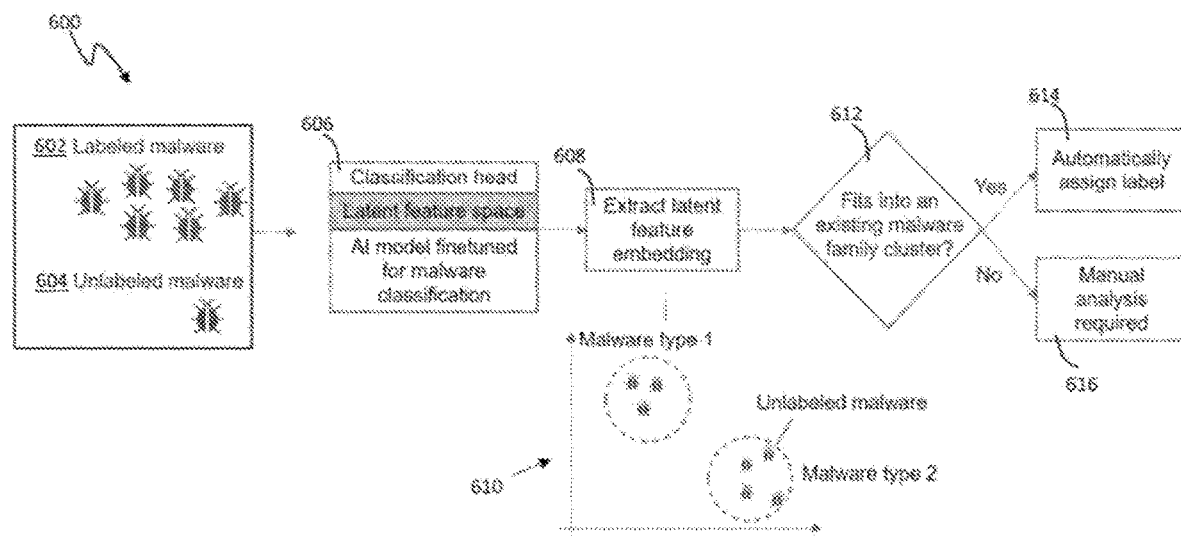
FIG. 6 is a flowchart of a method of malware behavior clustering, according to an embodiment.

New malware can't always be labeled with cloud intelligence, i.e., in the case where the malware has not yet been analyzed by security analysts. In such a case, embodiments described herein can find the malware family autonomously, for example, by behavior clustering. Referring to FIG. 6, a flowchart of a method 600 of malware behavior clustering is depicted, according to an embodiment. In an embodiment, family versioning engine 114 can implement malware behavior clustering.

In general, by inputting an unlabeled malware sample, embodiments try to find the malware family autonomously, via latent feature space of the AI model. The latent feature space refers to the output sequence of the transformer model, which serves as input to the classification head. The output sequence from the transformer is then fed into the classification head.

The classification head is typically a simpler model or a layer (like a fully connected neural network layer, softmax layer, etc.) that takes the complex features from the latent space and makes a final decision. In an embodiment, the classification head is configured to classify the input sample into a category (e.g. identifying the specific family of the malware). By clustering malware samples in latent feature space, the system can thus group malware samples with similar behavior.

Labeled malware 602 and unlabelled malware 604 can be utilized as inputs (e.g. to family versioning engine 114). At 606 the latent feature vectors for all known malware samples in 602 are generated. The feature vectors are stored and saved. At 604 the unlabelled sample is put into 606 and the feature vector is generated. At 608, and illustrated further in 610, K-means clustering is applied to the latent feature vectors. In an embodiment, K-means clustering is a simple algorithm that can group and cluster vectors efficiently into K groups. The vector representation of 604 is then checked at 610 to see if it falls into one of the generated clusters, if yes, then it belongs to the same family.

For the unlabeled malware sample, the latent feature vector is computed, and compared against existing clusters at 612. In the best case, there is only one close cluster, and this cluster has high purity, i.e., all samples in the cluster belong to the same malware family. In this first case, the system has successfully found the malware family, and can set the label of this new malware sample at 614. In the second case, the clustering does not yield a clear answer. In this second case, the malware sample is ignored for the moment, and will be analyzed later, by an analyst user at 616.

Referring again to FIG. 4, at 424, the behavior pattern of all samples in the particular malware family cluster are retrieved or fetched. For example, rules generation engine 116 can access behavior database 118 using the malware family as a lookup key. At 426, method 400 finds the simplest behavior rule that matches all malware samples or a predefined majority percentage of the group. At 428, the new malware rule is proposed. For example, rules generation engine 116 can propose the simplest behavior rule that matches all malware samples as a new proposed rule.

Referring to certain already-discussed operations, to propose a behavior rule, method 400 (e.g. executed by system 100) passes all samples from a given malware family through the AI model (e.g. ML model 110). More specifically, all behavior sequences of a malware family are fed into a transformer model, which is trained to predict the malware family version. The final prediction is then back-propagated through the model to the input sequence. This allows embodiments to find the parts of the input which contributed the most to the model's verdict.

Backpropagation is used during the rule generation phase. In embodiments, a backpropagation algorithm generally allows for propagating a model's prediction error back to the parameters of the model. Then, the parameters can be adjusted to improve the model. In particular, backpropagation is done after a new unlabeled sample is passed into the AI, and the score is mapped back to the most important feature which then will become part of the rules. Embodiments described herein also use a backpropagation algorithm, but not to backpropagate the prediction error, but the prediction score itself. By doing so, embodiments can find out which of the input parts had the largest influence on the model's output prediction. Moreover, the backpropagation does not go back to the model parameters, but to the input behavior sequence instead. By doing so, embodiments can know exactly which behavior event was most important and can even tell which event feature was most important.

Another way to look at this backpropagation is to consider the attention layers of the AI model. In an embodiment, the AI model used is a transformer neural network, which uses an attention mechanism. The attention mechanism helps decide which of the input tokens are the most important ones; each token gets an attention score. Tokens can be prioritized or ordered to determine the important tokens. For example, a certain predefined or configurable "top" number of tokens can be determined to be the most important and therefore relevant. Embodiments therefore leverage the attention score to find the most relevant behavior events and ignore the ones with low attention scores.

After this propagation operation, a small (ordered) set of crucial features are obtained for each malware sample of this malware family. Accordingly, embodiments can then search for a common pattern across all samples. The goal in the searching operation is to find a sequence of features which are present in all malware samples of this family and such that the sequence is not fully present in any other computer application. For this purpose, the system keeps a database with behavior patterns of all applications and checks that other applications do not match the newly proposed rule. In rare cases, there will be too much variability in the behavior of a malware family, and this operation will fail. This special case is handled by splitting a malware family into multiple families.

In an embodiment, a malware family can be split into multiple families. For malware families with many executable variants, it can be difficult to find one single behavior rule that is both precise and covers all samples. In such a situation, rules generation engine 116 can split the malware family into two or more groups.

In particular, during rule generation, it can be impossible to create a unique rule for a particular malware family. Either a proposed rule is too generic (it matches samples outside of the family) or too specific (it doesn't cover the whole family). In either of these cases, the malware family can be split to make the rule generation more manageable. Embodiments of rules generation engine 116 can use the latent feature space (e.g. 606) to group the malware family into two or more subgroups (e.g. a first subgroup and a second subgroup). In other words, the K-means clustering in 610 is used to generate smaller clusters by changing the parameters to look for more (smaller) clusters. This will automatically split up families in sub-clusters.

Within the two or more subgroups, the behavior variability will be lower. After the malware family is split into subgroups, rules generation engine 116 again attempts to generate one rule per new group. In the first subgroup and second subgroup example, rules generation engine 116 is applied to the first subgroup (and then also the second subgroup). Where unsuccessful, additional splits of the group can be conducted, until each group can be uniquely described by one rule. For example, the first subgroup can subsequently be split into a third subgroup and a fourth subgroup.

Figure 7:
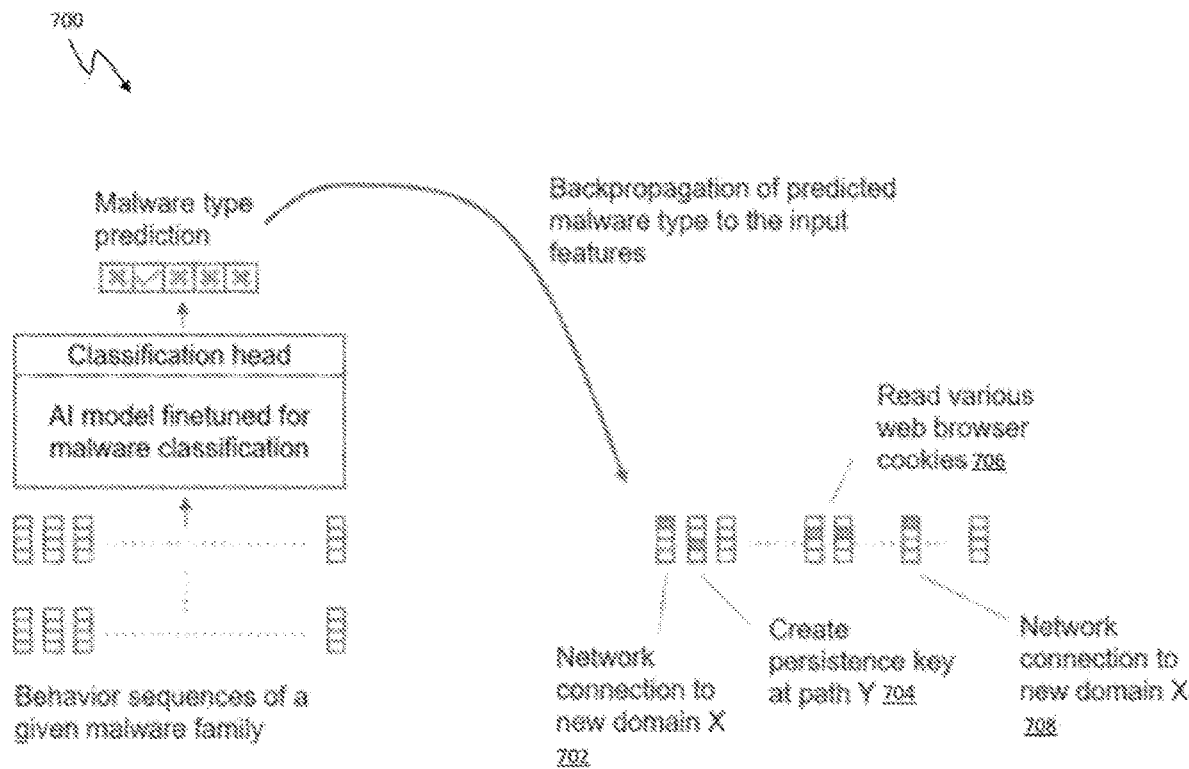
FIG. 7 is a flowchart of a method of finding a common malware family for rule generation, according to an embodiment.

Referring to FIG. 7, a flowchart of a method 700 of finding a common malware family for rule generation is depicted, according to an embodiment. In an embodiment, rules generation engine 116 can direct the operations of method 700.

In method 700, all malware samples in the family have a first event where data gets downloaded from a new domain X at 702. Next, all applications create persistence via a registry key at a specific registry path Y at 704. Consecutively, all applications read cookies of different popular web browsers at 706. Finally, all applications upload data to the initial domain at 708.

In an example, a malware family is a family of downloaders. A malware sample will do certain activities, then download a payload from domain X (702), then change a few things or not. Persistency is added (704) by setting a registry RUN key so that it starts with Windows. Subsequently, the variants can do various operations, like sleep, delete computer objects (e.g. files) stuff, check for bitcoin wallets, etc. All the malware in the family then also reaches the browser cookie files (706) and upload the browser cookie files to domain x (708). Accordingly, even though some operations or activities are executed in the middle that individual downloaders behave differently, each still has these four key feature behaviors in common.

In an embodiment, the above-mentioned behavior events mentioned are ones that received a high attention score by the AI model. In embodiments, each computer application will have many more behavior events, but which are ignored due to respective low attention scores.

Systems such as system 100 are configurable according to configuration parameters. In an embodiment, a configuration parameter includes a threshold for event importance. The attention score from the model needs to exceed a certain value to make an event contribute to a rule proposal.

In an embodiment, a configuration parameter includes a threshold for feature importance. Important events have both important and unimportant feature values. The features only contribute to the rule proposal if they exceed a given value during backpropagation.

In an embodiment, a configuration parameter includes a maximum number of events. In embodiments, a limit on the number of events deemed important can be predefined or otherwise configurable.

In an embodiment, a configuration parameter includes a maximum number of features per event. In embodiments, a limit for the number of features per event for rule creation can be predefined or otherwise configurable.

In an embodiment, a configuration parameter includes event type weight. Some behavior types are well known to be more indicative for malware detection. For example, process creations are generally more important than other event types. In embodiments, more weight to such important events.

Referring again to FIG. 4, at 430, an automation check is conducted. Optionally, at 432, the new proposed rule can be reviewed by a human analyst for subsequent approval at 434. In an embodiment, if method 400 is fully automated, the proposed malware rule is adopted or automatically approved as a new or updated malware behavior rule at 434.

Finally, at 436, the malware detection system is updated with the new behavior-based rule, such as a database of rules, as depicted in FIG. 4. In an embodiment, lightweight detection engine 104 can be updated or otherwise provided with access to the new behavior-based rule. From then on, the new malware sample will get detected properly on endpoint 106.

Accordingly, in an embodiment, an input of the system implementing method 400 is a malware sample (e.g. 402). In particular, for each new malware, the input is the complete behavior sequence of the malware. In an optional embodiment, the system utilizes an input of a label (family version) for each malware sample. In an optional embodiment, the system utilizes an input of an existing endpoint malware detection system (e.g. 420). Existing endpoint malware detection systems can serve as an additional source of labels. In an optional embodiment, the system utilizes an input of an external cloud intelligence (e.g. 418). External cloud intelligence can serve as an additional source of labels. In an embodiment, an output of the system is a malware behavior rule (e.g. 434). Each rule is specific for one malware family version or family variant.

Embodiments utilize malware labels. For a subset of malware samples, embodiments need to know the exact malware family. These strong labels are required for bootstrapping of the clustering algorithm such that the labels come from either cloud intelligence, or an existing detection system.

As an alternative, the system can work unsupervised, without any strong malware labels. In this case, embodiments simply need to know whether a given computer application is malicious or not. The foundational transformer model can then be used to autonomously find a weak malware label. To do so, the clustering algorithm described herein can be used. After clustering, the transformer neural network can be fine-tuned on the weak labels, to learn malware classification.

In an embodiment, systems and methods can be generalized from malware classification to computer application classification. In such an embodiment, systems and methods can distinguish between different malware families, and additionally between different computer applications. This allows for statistics on software inventory at user machines to be determined, including hardware drivers, web browsers, productivity applications, etc.

In an embodiment, systems and methods can be used in an EDR to highlight the most important nodes in a process provenance graph. With an EDR, security analysts can review suspicious looking incidents; these incidents normally span over multiple computer programs and include many behavior events. In such an embodiment, to make the security analyst user more efficient, the most suspicious behavior nodes can be colored in a special way. Systems and methods can therefore be used to find the most suspicious behavior events, by using the attention mechanism of the AI model.

The invention claimed is:

1. A computer-implemented method of protecting a system endpoint, the method comprising:
   logging behavior information of an application executing on an endpoint;
   generating a sequence of vectors for the behavior information including:
      creating a process behavior graph depicting all processes of the application, relationships between processes, and behavior of individual processes, and
      transforming the process behavior graph into a linear sequence of elements,
   wherein each element represents a node from the process behavior graph;
   pretraining an AI model on the linear sequence of elements, wherein the AI model is a foundational transformer neural network;
   tuning the AI model according to a malware family prediction or a benign application;
   querying the AI model with a new malware sample;
   proposing a malware detection rule based on the new malware sample, the malware detection rule including the malware family prediction; and
   backpropagating the malware family prediction through the AI model to adjust the AI model, including by identifying at least one feature of the queried new malware sample that most contributed to the malware family prediction.

2. The method of claim 1, wherein the transformer neural network uses an attention mechanism, and wherein backpropagating the malware family prediction includes:
   determining which of a plurality of input tokens are prioritized according to an attention score;
   determining most relevant behavior events according to the attention score; and
   ignoring input tokens with a low attention score.

3. The method of claim 1, further comprising:
   determining a common pattern across the new malware samples to find a sequence of features that are present in all of the new malware samples of a family but are not all present in any other application family.

4. The method of claim 1, wherein training the AI model on the linear sequence of elements includes pretraining tasks including at least one of:
   masked event prediction;

masked feature prediction;
next sequence prediction;
binary classification; or
classification into application type.

5. The method of claim 1, further comprising:
detecting the new malware sample executed on the endpoint;
gathering behavior information of the new malware sample;
extracting relevant behavior information by the AI model;
determining the malware family of the new malware sample;
fetching a behavior pattern for the malware family for all samples in a malware family cluster; and
determining a malware detection rule that matches the behavior pattern for all samples in the malware family cluster.

6. The method of claim 5, wherein determining the malware detection rule that matches the behavior pattern for all samples in the malware family cluster further comprises: splitting the malware family into a first subgroup and a second subgroup; determining a first malware detection rule that matches the behavior pattern for all samples in the first subgroup; and determining a second malware detection rule that matches the behavior pattern for all samples in the second subgroup.

7. The method of claim 1, further comprising providing a lightweight malware detection engine with the malware detection rule, wherein the lightweight malware detection engine does not implement an AI module.

8. The method of claim 7, further comprising providing the malware detection rule to an analyst user for approval prior to providing the lightweight malware detection engine with the malware detection rule.

9. The method of claim 1, wherein querying the AI model with the new malware sample includes extracting a plurality of relevant portions of a behavior pattern of the new malware sample, and wherein proposing the malware detection rule based on the new malware sample includes associating the relevant portions of the behavior pattern to common behavior of the malware family prediction.

10. A system for protecting a system endpoint, comprising:
an endpoint database configured to store behavior information of an application executing on an endpoint;
a proposal subsystem including:
at least one processor operably coupled to memory;
instructions stored in memory that, when executed by the at least one processor, cause the at least one processor to implement:
a representation engine configured to:
generate a sequence of vectors for the behavior information including:
creating a process behavior graph depicting all processes of the application, relationships between processes, and behavior of individual processes, and
transforming the process behavior graph into a linear sequence of elements, wherein each element represents a node from the process behavior graph;
a training engine configured to:
pretrain an AI model on the linear sequence of elements, wherein the AI model is a foundational transformer neural network, and
tune the AI model according to a malware family prediction or a benign application,
the AI model configured to be queried with a new malware sample; and
a rules generation engine configured to:
propose a malware detection rule based on the new malware sample, the malware detection rule including the malware family prediction, and
backpropagate the malware family prediction through the AI model to adjust the AI model, including by identifying at least one feature of the queried new malware sample that most contributed to the malware family prediction.

11. The system of claim 10, wherein the transformer neural network uses an attention mechanism, and wherein the rules generation engine is further configured to backpropagate the malware family prediction including:
determining which of a plurality of input tokens are prioritized according to an attention score,
determining most relevant behavior events according to the attention score; and
ignoring input tokens with a low attention score.

12. The system of claim 10, wherein the rules generation engine is further configured to:
determine a common pattern across the new malware samples to find a sequence of features that are present in all of the new malware samples of a family but are not all present in any other application family.

13. The system of claim 10, wherein the training engine is further configured for pretraining tasks including at least one of:
masked event prediction;
masked feature prediction;
next sequence prediction;
binary classification; or
classification into application type.

14. The system of claim 10, wherein the AI model configured to be queried with the new malware sample applies the AI model to extract relevant behavior information and determine the malware family of the new malware sample, wherein the rules generation engine is further configured to:
fetch a behavior pattern for the malware family for all samples in a malware family cluster, and
determine a malware detection rule that matches the behavior pattern for all samples in the malware family cluster.

15. The system of claim 14, wherein the rules generation engine is further configured to
determine the malware detection rule that matches the behavior pattern for all samples in the malware family cluster including:
splitting the malware family into a first subgroup and a second subgroup;
determining a first malware detection rule that matches the behavior pattern for all samples in the first subgroup; and
determining a second malware detection rule that matches the behavior pattern for all samples in the second subgroup.

16. The system of claim 10, wherein the proposal subsystem further comprises instructions stored in memory that, when executed by the at least one processor, cause the at least one processor to implement:
a detection engine communicatively coupled to the proposal subsystem and configured to implement the malware detection rule, wherein the detection engine does not implement an AI module.

17. The system of claim 16, wherein the rules generation engine is further configured to provide the malware detection rule to an analyst user for approval prior to providing the detection engine with the malware detection rule.

18. The system of claim 10, wherein the AI model is further configured to:
  extract a plurality of relevant portions of a behavior pattern of the new malware sample, and
  wherein the rules generation engine is further configured to propose the malware detection rule based on the new malware sample including by associating the relevant portions of the behavior pattern to common behavior of the malware family prediction.

19. A computer-implemented method of protecting a system endpoint, the method comprising:
  creating a plurality of sequences of behavior events for logged endpoint detection and response (EDR) data including by generating a process graph depicting all processes of an application, relationships between processes, and behavior of individual processes and transforming the process graph into a linear sequence of elements;
  pretraining a foundational neural network machine learning (ML) model using the linear sequence of elements;
  tuning the AI model according to a malware family or a benign application;
  querying the ML model with a new malware sample to determine a malware prediction;
  backpropagating the malware prediction through the ML model, including by identifying a feature of the queried new malware sample that most contributed to the malware prediction; and
  adjusting the ML model according to the backpropagating based on the feature of the queried new malware sample that most contributed to the malware prediction.

20. The method of claim 19, wherein the ML model utilizes an attention mechanism to tokenize the sequences of behavior events to generate an attention score for each event, wherein adjusting the ML model further comprises applying relevant behavior events based on the attention score for each event compared to a threshold and ignoring non-relevant behavior events based on the attention score for each event compared to the threshold.

* * * * *